United States Patent [19]

Durham

[11] Patent Number: 4,704,919

[45] Date of Patent: Nov. 10, 1987

[54] TWO-PIECE CRANKSHAFT FOR BICYCLES

[76] Inventor: Roger O. Durham, 1370 Thompson St., Glendale, Calif. 91201

[21] Appl. No.: 841,273

[22] Filed: Mar. 18, 1986

Related U.S. Application Data

[63] Continuation of Ser. No. 675,956, Nov. 28, 1984, abandoned.

[51] Int. Cl.$^4$ .............................................. G05G 1/14
[52] U.S. Cl. .................................. 74/594.1; 74/594.2
[58] Field of Search .................. 74/594.1, 594.2, 594.3

[56] References Cited

U.S. PATENT DOCUMENTS

| 626,227 | 6/1899 | Gaylor | 74/594.1 |
| 627,597 | 6/1899 | Scott | 74/594.2 |
| 3,906,811 | 9/1975 | Thun | 74/594.1 |

FOREIGN PATENT DOCUMENTS

| 426292 | 10/1947 | Italy | 74/594.1 |
| 11284 | of 1891 | United Kingdom | 74/594.1 |
| 24811 | of 1897 | United Kingdom | 74/594.1 |
| 643288 | 9/1950 | United Kingdom | 74/594.1 |

*Primary Examiner*—Richard E. Moore
*Assistant Examiner*—Vinh Luong

[57] ABSTRACT

A two-piece crankshaft for a bicycle having a chain drive. One crank arm is welded to one end of a tubular, cylindrical spindle having a spline at its other end. The other crank arm is welded to an internally-splined boss which engages the splined end of the spindle. A pinch bolt secures the splined arm. A sprocket mounting pad having a threaded central mounting hole is welded intermediate the ends of one of the crank arms. A conventional bicycle sprocket having a central hole and a radially located driving slot slips onto the crankshaft spindle, abuts the mounting pad, and is secured to it by a bolt. The spindle is mounted in ball bearings inserted in bearing bores of the bicycle frame, and spacers are disposed between the crank arms and the bearings to position the two arms away from the frame.

4 Claims, 7 Drawing Figures

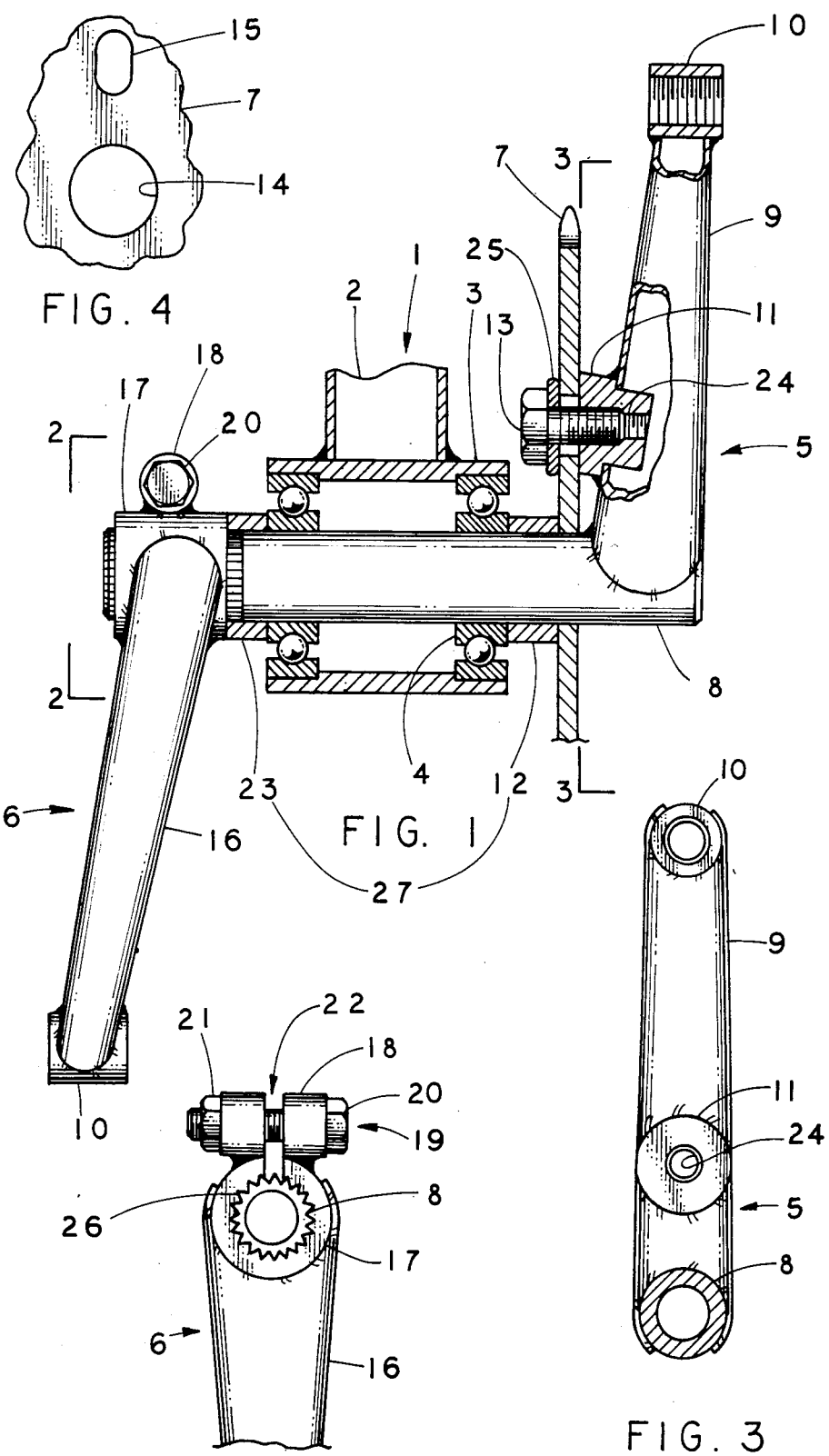

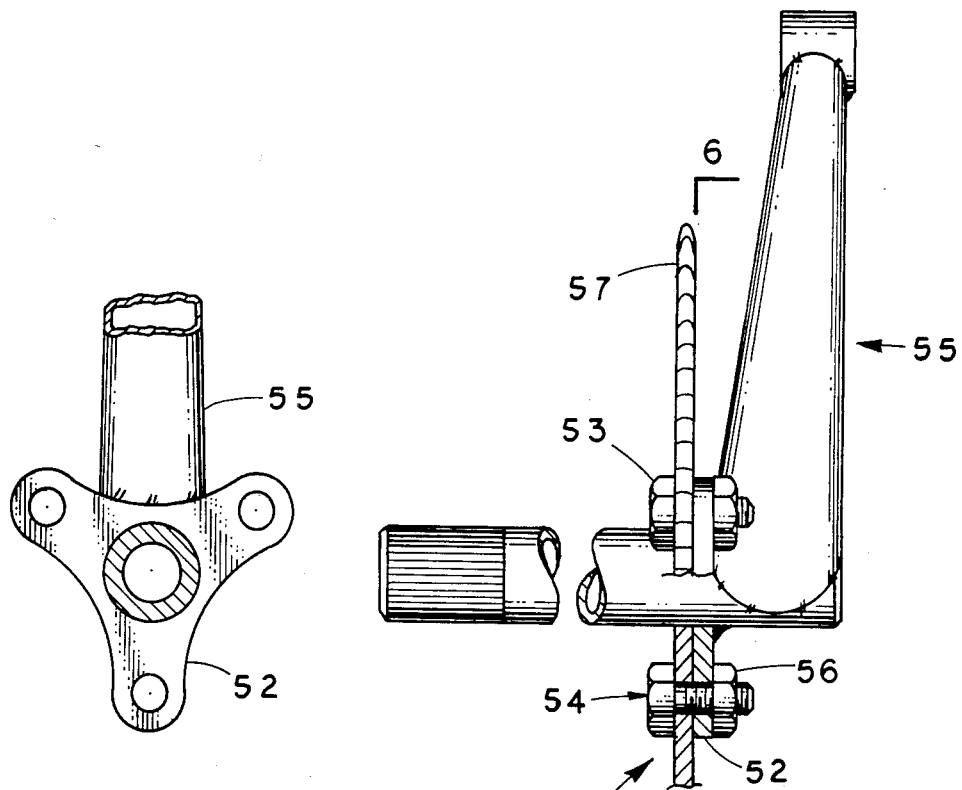
FIG. 6
FIG. 5
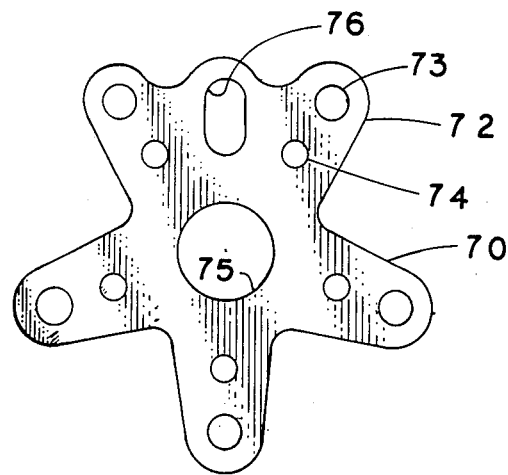
FIG. 7

4,704,919

TWO-PIECE CRANKSHAFT FOR BICYCLES

This application is a continuation of application Ser. No. 675,956 filed on Nov. 28, 1984, now abandoned.

BACKGROUND OF THE INVENTION

1. Field of the Invention

This invention relates to bicycle crankshafts, to ways of mounting sprockets onto such crankshafts, and to ways of installing such crankshafts in bicycle frames.

2. Description of the Prior Art

Many of today's bicycles are subjected to severe useage on dirt tracks and on mountain trails, creating greater need for strength and rigidity in their crankshafts. At the same time, lightness is also much needed and sought after. Crankshafts which are light, rigid, and strong, are therefore much in demand.

Current bicycle crankshafts are usually of two types; 1-piece cranks, and 3-piece cranks.

One-piece cranks have a zee-shaped crank wherein both arms are integral with a central spindle. The zee-shaped crank is partly inserted thorugh the bicycle's crank tube, and bearings are then installed to rotatably support the crankshaft. one-piece crankshafts have several drawbacks.

(a) Usually, solid steel forgings are used for 1-piece cranks, making them relatively heavy for their strength and rigidity.

Where one-piece cranks have been produced out of tubular members which have been welded together, light, but relatively flexible and weak cranks have resulted, partly because of the requirement that one end of the crank must insert through the crank tube of the frame, which creates geometrical restrictions on the shape of such one-piece cranks, resulting in weak and flexible cranks, for their weight.

Three-piece crankshafts have a separate spindle, which is rotatably supported by bearings mounted in the crank tube of the bicycle frame. Crank arms are usually secured to the ends of the spindle by means of mating, four sided tapers, although cross pins or splined connections are sometimes used.

Such three-piece construction has several disadvantages:

(a) Usually, the crank arms are solid aluminum forgings, which are heavy for their strength and rigidity.

(b) The area of the four-sided taper is one of high stress for both the steel spindle and for the aluminum crank arms. Aluminum arms occasionally enlarge at that point. If a steel spindle is ever to break, it will break at the taper first, in most cases.

Occasionally, tubular steel crank arms have been produced having a boss with an internal four-sided taper. Here, a heavy boss portion is required, and also, the steel-to-steel joint tends to come loose more frequently than does the usual aluminum-to-steel joint.

Three-piece cranks having two splined connections have been used with some success, although they are unduly heavy and require extra machining and spline orientation.

Neither one-piece cranks nor 3-piece cranks have been entirely satisfactory.

In both three-piece and one-piece crankshafts, sprocket changing is time consuming, because of the need to remove one of the crank arms, or to disassemble the crankshaft and its support bearings. To speed up such sprocket changes, spiders are fitted to the crankshafts which mount several different sizes of sprockets, thus allowing for quick sprocket changing without dismantling the crankshaft installation itself.

While this accomplishes the desired result, it would be more convenient to be able to remove the crankshaft with little difficulty and to be able to change sprockets quickly, without the need for separate spiders with their machined indexing diameters and bolting patterns.

SUMMARY OF THE INVENTION

In the current invention, a two-piece crankshaft is shown, in which one of the crank arms is welded to one end of a cylindrical spindle, to form a spindlearm. A removable crank arm is splined to the other end of the spindle, and it is secured by a pinch bolt. The cylindrical spindle is rotatably supported by bearings which are supported in the bicycle frame.

In the preferred embodiment, a single, centrally-located bolt secures the bicycle sprocket to a mounting pad having a threaded central hole. The mounting pad is located intermediate the ends of the fixed crank arm, which is welded to the cylindrical spindle. By such an arrangement, several advantages accrue:

(a) Loose spacers, or washers can be inserted between the crank arms and the bearings in the frame, allowing for easy lateral adjustment of the sprocket, to obtain correct chain alignment.

(b) Because the arms can be made of formed and welded steel, they can be very thin and have large cross sections, making for a very efficient design in terms of weight, strength, and rigidity.

(c) The welded joint between one of the crank arms and the spindle saves the weight of a separate boss, and is inexpensive to produce, compared to tapered or splined connections, and it transmits the loads to the spindle in an efficient way.

(d) Larger and stronger 9/16 pedal threads can be used.

(e) It is very easy to remove the entire crankshaft to change a sprocket; only a pinch bolt at the spline connection needs be loosened for the arm to come off. The spindle slides out, and the bolt holding the sprocket onto the pad is removed, freeing the sprocket. Sprocket changes can be made so quickly and easily as to eliminate the need for separate spacers and chainrings, such as those used with three-piece and one-piece cranks.

Accordingly, the current invention has the following objects:

1. To provide a tubular, two-piece crankshaft for bicycles which is light, strong, and rigid.
2. To provide a bicycle crankshaft in which one arm is splined to the spindle and which can be removed by loosening only one pinch bolt and sliding the arm off the spline.
3. To provide a bicycle crankshaft in which the spindle can be inserted through its support bearings, withdrawn from them, without making bearing adjustments.
4. To provide a bicycle crankshaft which uses one bolt to secure the bicycle sprocket to the crank arm.
5. To provide a bicycle crank arm which uses arms and a spindle having relatively large cross sections and thin walls, allowing for easy welding of one member to another, allowing for successful heat-treatment of the entire weldment, and providing a structure having the most strength and rigidy for its weight.
6. To provide a bicycle crankshaft in which the spread between crank arms can be adjusted by adding or withdrawing spacers.

Two-piece cranks made according to this invention are lighter than the lightest three-piece cranks using aluminum crank arms. In addition, they are about twice as rigid, and they are much stronger. They are similarly lighter, stronger, and more rigid than the lightest tubular one-piece crankshafts now being made. They offer a significant improvement over any cranks which have been produced before.

BRIEF DESCRIPTION OF THE DRAWINGS

FIG. 1 shows a portion of a bicycle frame in cross section, including a seat tube and a crank tube, into which a pair of ball bearings are inserted. A two-piece bicycle crankshaft according to the invention, is shown in elevation and partial cross-section, consisting of a spindlearm means and a removable crank arm means.

FIG. 2 is an end view of the two-piece bicycle crankshaft of FIG. 1, taken along line 2—2 of FIG. 1, showing a splined connection and pinch bolt arrangement whereby the removable crank arm means is secured to the spindle of the spindlearm means.

FIG. 3 is taken along line 3—3 of FIG. 1, and shows the spindlearm means of FIG. 1 in partial cross section. A sectioned tubular spindle, a tubular crank arm, a threaded pedal boss, and a threaded sprocket mounting pad are shown.

FIG. 4 shows a portion of the bicycle sprocket by itself. The central part of such a sprocket is shown, including a central sprocket hole and a driving slot.

FIG. 5 shows an alternate form of the two-piece crankshaft of the invention, wherein the sprocket is secured to the spindlearm means by means of a three-armed spider, which is welded to the spindlearm, and by bolts and nuts.

FIG. 6 is a section taken along line 6—6 of FIG. 5, showing the spindlearm means in section, the crank arm, and the three-armed spider. The fastening bolts are not shown.

In FIG. 7, is shown the plan view of an adapter plate which would adapt the two-piece crankshaft shown in FIG. 1, to separate sprockets of different sizes.

DETAILED DESCRIPTION OF THE DRAWINGS

Referring to FIG. 1, a portion of a bicycle frame means 1 includes a seat tube 2 and a crank tube 3. A pair of ball bearing means 4 having inner and outer races, is inserted into opposing bores and abutt shoulders of said crank tube 3.

A spindlearm means 5 includes a cylindrical spindle 8, a fixed crank arm 9, a mounting pad 11, and an internally-threaded pedal boss 10. Said cylindrical spindle 8 has an external spline 26 at one end, and slips through the inner races of said bearings 4. Said fixed arm 9 is permanently secured by welding or brazing to the end of said cylindrical spindle 8 opposite said spline 26. Said pedal boss 10 is similarly welded or brazed to said fixed crank arm 9, as is said mounting pad 11. Said mounting pad 11 has a threaded central hole 24, which is engaged by corresponding threads of a bolt 13. Said bolt 13 inserts through a washer 25, and thence inserts through a driving slot 15 of a bicycle sprocket 7 having a central mounting hole 14, which engages said cylindrical spindle 8. Elements of said sprocket 7 are more clearly shown in FIG. 4.

A removable crank arm means 6 is comprised of a removable crank arm 16, an internally-splined boss 17, having a longitudinal slot 22 (see FIG. 2), an internally-threaded pedal boss 10, and a pair of pinch bolt bosses 8, which are positioned in axial alignment with each other on opposite sides of said longitudinal slot 22. Said spline boss 17, said pedal boss 10, and said pinch bolt bosses 18 are permanently secured to said removable crank arm 16 by such means as welding or brazing.

A pinch bolt means 19 is comprised of a pinch bolt 20, which inserts through said pinch bolt bosses 18, and a nut 21. Tightening said pinch bolt means 19 secures said removable crank arm means 6 to said cylindrical spindle 8. A spacer 12, adapted for abutting said bicycle sprocket 7 and the inner race of said ball bearing means 4, and a spacer 23, adapted for abutting said internally-splined boss 17 and the inner race of the other said ball bearing means 4, comprise a spacer means 27, adapted for positioning said spindlearm means 5 and said removable crank arm means 6 away from said bearing 4 inner races.

In FIG. 2, the external spline 26 of said cylindrical spindle 8 is shown to be engaged by said internally-splined boss 17. Said longitudinal slott 22 of said internally-splined boss 17 is shown. The pinch bolt bosses 18 are shown, along with the pinch bolt means 19, including said pinch bolt 20 and said nut 21. The removable crankarm 16 is shown welded to the internally-splined boss 17.

In FIG. 3, the fixed crank arm 9 is shown welded to the cylindrical spindle. Said pedal boss 10 is welded to the fixed crank arm 9, as is said mounting pad 11. The centrally located threaded hole 24 of said mounting pad 11 is shown.

In FIG. 4, a plan view of the central portion of said bicycle sprocket 7 is shown. Said central mounting hole 14 is adapted for engagement with said cylindrical spindle 8. Said driving slot 15 allows for the insertion of said bolt 13, which secures said bicycle sprocket 7 to said mounting pad 11.

In FIG. 5, a bicycle sprocket 57 is secured to a spindlearm means 55 by a sprocket mounting means 51. Said sprocket mounting means 51 is comprised of a 3-armed spider 52, which is secured by welding or brazing to the spindle of said spindlearm means 55, and a fastener means 54.

Said fastener means 54 is comprised of 3 pairs of bolts 53 and nuts 56; said bolts 53 insert through holes in said sprocket 57, insert through a hole 59 in said spider 52, and engage one of said nuts 56. Tightening said fastener means 54 secures said sprocket 57 to said spider 52.

In FIG. 6, the spindlearm 55 is shown, with the 3-armed spider 52 welded to it. Said fastener means 54 is not shown.

In FIG. 7, a sprocket adapter plate 70 is shown to have five arms 72, 5 outer holes 73, which are adapted for mounting a sprocket ring, which isn't shown, 5 inner holes 74, adapted for mounting a smaller sprocket ring, which is also not shown, a central hole 75, adapted for engaging the spindle 8 of said spindlearm means 5. A slot 76 allows said adapter plate 70 to be mounted against said mounting pad 11 and be secured by said bolt 13.

MODE OF OPERATION

The central mounting hole 14 of said bicycle sprocket 7 slidably engages cylindrical spindle 8 and abutts said mounting pad 11. Said bicycle sprocket 7 is secured by said bolt 13, which passes through said driving slot 15 and engages said threaded central hole 24.

The spacer 12 slips onto said crank spindle 8 and abutts the sprocket 7. Spindle 8 then inserts through the pair of bearings 4 until said spacer 12 abutts said bearing 4. Said spacer 23 engages said cylindrical spindle 8 and abutts said bearing means 4.

Said removable crank arm means 6 slips onto said external spline 26 and abutts said spacer 23. Said pinch bolt 20 is inserted, nut 21 installed, and the pinch bolt means 19 is tightened, thus securing the removable crank arm means 6 to said cylindrical spindle 8.

It will be seen that to change bicycle sprockets, a person needs only to loosen pinch bolt means 19, to withdraw the spindlearm means, and to remove the bolt 13, before removing said sprocket 7; installation of another size sprocket is rapid and easy.

It is within the scope of the current invention that a removable sprocket adapter be bolted to the spindlearm means, or to the removable crank arm means, and that separate chain rings would be in turn secured to such a removable sprocket adapter.

I claim:

1. In a bicycle having a crank tube with ball bearings mounted in opposite bores of said bicycle crank tube, said ball bearings having normally inseparable inner races and outer races, a two-piece bicycle crankshaft including:
   (a) a spindlearm means comprising: a cylindrical spindle for sliding engagement with the inner races of said ball bearings, said spindle having an external spline at one end; a fixed crank arm permanently secured to the other end of said spindle; and an internally-threaded pedal boss permanently secured to one end of said fixed crank arm;
   (b) a removable crank arm means comprising: a removable crank arm; an internally-threaded pedal boss permanently secured to one end of said removable crank arm; an internally-splined boss secured to the other end of said removable crank arm, said internally-splined boss for engagement with said external spline of said spindle, said internally-splined boss having a longitudinal slot extending from a bore of said internally splined boss to an outer surface of said internally splined boss; a pair of pinch bolt bosses permanently secured to said internally-splined boss on opposite sides of said longitudinal slot, said pinch bolt bosses being axially aligned with each other;
   (c) Tubular spacer means for positioning said spindle-arm means and said removable crank arm means away from said bearing inner races;
   (d) pinch bolt means for insertion through said pinch bolt bosses, and for securing said removable crank arm to said spindle;
   (e) sprocket mounting means for mounting a bicycle drive sprocket to one of said crank arms.

2. Apparatus according to claim 1, wherein said sprocket mounting means comprises:
   (a) a mounting pad permanently secured to one of said crank arms intermediate its ends, said mounting pad having a threaded central hole;
   (b) a bolt for insertion through a driving slot of a bicycle sprocket and for engaging said threaded hole of said mounting pad, and wherein a central mounting hole of said bicycle sprocket slidably engages the spindle of the two-piece crank arm.

3. Apparatus according to claim 1, wherein a bicycle sprocket having a mounting hole pattern is mounted by a sprocket mounting means comprising;
   (a) a sprocket mounting spider secured to one of said crank arms;
   (b) fastener means for securing said sprocket to said spider.

4. Apparatus according to claim 1, wherein a bicycle sprocket having a mounting bolt hole pattern is mounted by a sprocket mounting means comprising;
   (a) a sprocket mounting spider secured to said spindle;
   (b) fastener means for securing said sprocket to said spider.

* * * * *